United States Patent Office 2,978,290
Patented Apr. 4, 1961

2,978,290

COLOURED POLYMERIC SYNTHETIC MATERIAL

Werner Bossard, Riehen near Basel, and Jacques Voltz, Basel, Switzerland, assignors to J. R. Geigy A.-G., Basel, Switzerland No Drawing. Filed Oct. 20, 1958, Ser. No. 768,055

8 Claims. (Cl. 8—55)

The present invention concerns a process for the dyeing and printing of synthetic materials made up from polymerised or copolymerised acrylonitrile. It also concerns, as industrial product, the materials fast dyed according to the new process.

It has now been found that colour salts, the coloured cations of which contain no carboxylic acid and sulphonic acid groups and which correspond to the general formula

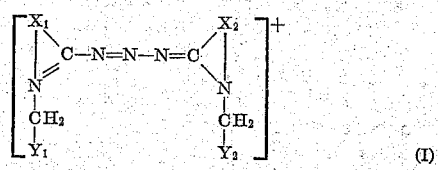

(I)

are excellently suitable for the dyeing and printing in pure and fast shades of polymeric synthetic materials which are produced to a great extent from acrylonitrile.
In the above formula $Y_1$ and $Y_2$ each represent a member selected from the group consisting of hydrogen, lower alkyl, carbalkoxy and mononuclear aryl radicals, and $X_1$ and $X_2$ each represent the divalent radical necessary to complete a heterocyclic nucleus containing from 5 to 6 atoms in the heterocyclic ring.

For the rest, the formula should be read as representing not just the electromeric formula given but as embracing all electromeric possibilities.

The colour salts used according to the present invention are diazoamino compounds in which two heterocyclic nitrogen-containing rings are bound by a triazene group . They are referred to in the following as triazene dyestuffs.

The anions of these colour salts which, advantageously, are not coloured and therefore are of no importance to the dyestuff character, are derived in particular from strong inorganic or organic acids, if desired complex acids, for example from halogen hydracids, from sulphuric acid, sulphuric acid monoalkyl esters, perchloric acid or the double salt of the chloride of the dyestuff with zinc chloride, from strong aliphatic carboxylic acids such as oxalic acid or lactic acid or from aromatic sulphonic acids such as e.g. benzene sulphonic acid or toluene sulphonic acids.

According to the general Formula I the triazenes used according to the present invention contain two nitrogen-containing five or six membered hetero rings. These can also be condensed with other rings, advantageously aromatic-isocyclic rings. The radicals $X_1$ and $X_2$ are either organic divalent radicals or divalent hetero groups or hetero atoms. Chiefly nitrogen, oxygen and sulphur atoms are meant by hetero atoms according to the present invention. Those members of the radicals $X_1$ and $X_2$ which complete the nitrogen-containing hetero rings can consist only of carbon atoms or of carbon and hetero atoms or of hetero atoms alone. The number of members completing the rings depends on the size of the hetero rings. The members of the radicals X which do not take part in the ring formation are substituents of the hetero ring or components of fused rings.

Some examples are given in the following which illustrate the meanings of $X_1$ and $X_2$. Chiefly those radicals are meant in which the members completing the nitrogen-containing hetero ring are of a purely organic nature. For example if X is an $\alpha.\gamma$-propenylene radical, then the heterocyclic ring is an isopyrrole ring. An $\alpha.\delta$-butadienylene radical produces a pyridine ring bound in the $\alpha$-position to the triazene group. Finally, if X is a styryl radical bound in o-position to the vinyl group, then the hetero ring is a quinoline ring bound in the $\alpha$-position to the triazene group.

Further examples of those radicals $X_1$ and $X_2$ are given below in which the chain completing the nitrogen-containing hetero ring contains hetero atoms. For example if X is the group —CH=CH—S—, then it completes a thiazole ring. Correspondingly, the group

—CH=CH—O— completes an oxazole ring, the group —CH=CH—NH— completes an imidazole ring, the group —N=CH—NH— completes a triazole ring, the group —N=N—NH— completes a tetrazole ring and the group —N=CH—S— completes a thiadiazole ring. If, in the triazene compounds used according to the present invention the nitrogen-containing heterocycles are condensed with other rings, then these are advantageously aromatic-isocyclic rings. Examples are the benzimidazole, indazole, benzoxazole, benzthiazole and naphthothiazole rings. These rigns are linked to the triazene group when X represents an anilino, phenoxy, phenylthio or naphthylthio radical bound at the hetero atom and in o-position thereto.

The organic radicals bound at the ring nitrogen atoms and represented in the general Formula I by —$CH_2$—$Y_1$ and —$CH_2$—$Y_2$ are chiefly of an araliphatic or aliphatic nature; advantageously they are benzyl and alkyl groups which may possibly be substituted. Also, $Y_1$ and $Y_2$ can be carbalkoxy radicals such as e.g. the carbomethoxy or carbethoxy radical. The triazene dyestuffs used according to the present invention can otherwise be substituted as desired except by acid dissociating groups. The substituents may be, in particular, those usual in azo dyestuffs, for example halogens, cyano, alkyl, alkoxy, alkylamino, alkyl sulphonyl, carboxylic acid and sulphonic acid ester and amide groups.

Preferred dyestuffs usable according to the present invention are those in which the symbols —$CH_2$—$Y_1$ and $CH_2$—$Y_2$ in the general formula represent low molecular alkyl groups. For technical and economic reasons they are in particular methyl and ethyl groups. Dyestuffs in which the nitrogen-containing hetero rings are of aromatic character and have five members are particularly preferred.

Of these preferred triazene dyestuffs, those are particularly preferred in which at least one hetero ring is an azole ring, chiefly a pyrazole, imidazole, triazole, tetrazole, thiazole, thiadiazole or oxazole ring, and this azole ring is advantageously bound with a benzo radical which may possibly be substituted such as for example in the benzimidazole, indazole, benzthiazole and benzoxazole rings. Finally, triazene compounds in which both hetero rings are azole rings of the preferred type, are a valuable class of dyestuffs within the scope of the present invention.

Particularly valuable and therefore preferred are the benzthiazole triazene dyestuffs.

The triazenes used according to the present invention can be produced for example in the following manner: a heterocyclic amine of the general formula

wherein X has the meaning of $X_1$ or $X_2$, is coupled with the diazonium compound of an identical or different heterocyclic amine of the general Formula II and the coupling product is converted into a cationic colour salt by treatment with alkylating agents.

Another production process consists in coupling a diazonium compound of a heterocyclic amine of the general Formula II with an imino compound of the general formula

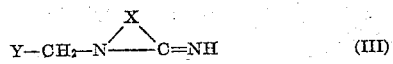

wherein

X has the meaning given above and
Y has that of $Y_1$ or $Y_2$, and alkylating the coupling product. The imino compounds can be produced for example from heterocyclic amines of the general Formula II with alkylating agents. A third method of producing the triazene dyestuffs used according to the present invention consists in condensing a heterocyclic amine of the general Formula II with a nitroso imine which is obtained by treating an imine of the general Formula III with nitrous acid. The condensation product is then converted into the cyclammonium compound. This is done by treating it for example with esters of low alcohols and halogen hydracids, sulphuric acid or aromatic sulphonic acids. Triazene compounds in which the two radicals $Y_1$ and $Y_2$ are different from each other can be produced by the second and third processes.

In the process according to the present invention, triazene dyestuffs containing cyclammonium groups are used advantageously as salts of strong inorganic or organic acids, in particular as chlorides or bromides, double salts of the dyestuff hydrochloride and zinc chloride, as perchlorates or methyl sulphates, as benzene sulphonates or p-methyl benzene sulphonates. In these forms they dissolve in water with a more or less neutral reaction and dye fibres of polymeric or copolymeric synthetic materials which are produced to a great extent from acrylonitrile in weakly acid, neutral to weakly alkaline baths at a raised temperature. The fibres or textiles made up therefrom are dyed advantageously in an acetic acid, formic acid or sulphuric acid bath in a pH range which can vary between, for example, 2 to 6. Dyeing is performed advantageously at the boil, possibly under pressure and if necessary in the presence of leveling agents, wetting agents and other dyeing additives. The so-called carriers, among others, are such additives, for example benzoic acid, o-phenylphenol, salicylic acid ester, β-cyanoethyl formamide and β-cyanoethyl benzamide, which cause an improvement in the drawing power of the dyestuffs. It is sometimes of advantage to add retarding agents to the dye baths. With mixtures of different dyestuffs or of different types of dyestuffs such as are necessary for example for the dyeing of mixed fabrics as well as for the attainment of fashionable shades, these retarding agents cause the dyestuffs to draw evenly onto the fibres with good exhaustion of the bath. For example, organic polysulphonic acids, possibly in the presence of a fatty alcohol polyglycol ether acting as a dispersing agent can be used as such retarding agents. Apart from dyeing from an aqueous bath, the triazene dyestuffs used according to the present invention can also be used for the printing of polymeric or copolymeric acrylonitrile fabrics or foils.

Fibres consisting of polymeric or copolymeric synthetic materials which are produced to a great extent from acrylonitrile and are intended as goods to be dyed in the present process are, for example, the marketed products "Crylor" of the Société Rhodiaceta S.A., Lyons (France), "Dralon" of Farbenfabriken Bayer A.G., Dormagen (North Rhineland-Westphalia), "Orlon 42" of E. I. du Pont de Nemours & Co. Inc., Wilmington, Delaware (U.S.A.), "Nymcrylon" of N.V. Kunstzijdespinnerij, Nyma, Nijmegen (Holland) and "Wolcrylon" of VEB Film- and Chemiefaserwerk AGFA-Wolfen, Wolfen (Bitterfeld region).

Pure yellow to red dyeings are obtained with the triazene dyestuffs used according to the present invention on fibres or fabrics made up from polyacrylonitrile such as, for example, "Orlon 42." On dyeing mixed fabrics made up from acrylonitrile polymers and wool, the latter is practically completely reserved. That these triazene compounds could be used for attaining technically valuable dyeings could not have been foreseen as usually triazene compounds are instable in acid solution at a raised temperature and split into the corresponding diazonium and amino compounds. The stability of the triazene compounds claimed, even in mineral acid, boiling aqueous solutions is, therefore, all the more surprising. The dyeings obtained with these compounds on fibres made up of polyacrylonitrile are distinguished also by surprisingly good fastness to washing, milling, ironing and pleating. Also, in contrast to other diazoamino compounds, some of the claimed triazene compounds have really excellent fastness to light on polyacrylonitrile fibres which is all the more remarkable as the triazene compounds according to the present invention decompose extraordinarily easily on exposure to light. The new dyestuffs have excellent leveling powers and fasteness to cross dyeing.

Further details can be seen from the following examples which serve to illustrate the invention without limiting it in any way. Where not otherwise stated, in the examples parts are given as parts by weight and the temperatures are in degrees centigrade. The relationship of parts by weight to parts by volume is as that of kilogrammes to litres.

*Example 1*

0.5 parts of the dyestuff

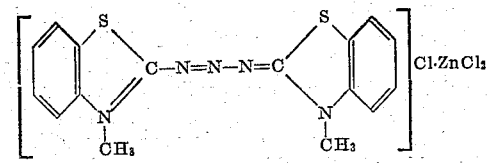

are pasted with 0.5 parts of 80% acetic acid and dissolved in 4000 parts of hot water. 1.0 part of 80% acetic acid, 2 parts of sodium acetate and 4 parts of a condensation product from olein alcohol and 15 mol of ethylene oxide are added. The pH of this solution is about 4.5. At 50°, 100 parts of "Orlon 42" (polyacrylonitrile fibre of du Pont, Wilmington, Delaware U.S.A.) are entered, the temperature is raised within 15 minutes to 100° and dyeing is performed for one hour at the boil. The dyebath is almost completely exhausted after this time. The dyed goods are saponified at 80° for 15 minutes in 5000 parts of water with 5 parts of a fatty alcohol sulphonate and then rinsed and dried. The Orlon 42 fibre which has been dyed in vidid orange shades has excellent fastness to washing and light.

The dyestuff used is obtained by condensing 2-nitroso-imino-3-methyl - 2,3 - dihydrobenzthiazole and 2-amino-benzthiazole in glacial acetic acid and then methylating in dimethyl sulphate at 100–110°.

It is isolated by taking up the methylation product in water and precipitating the colour salt with zinc chloride and sodium chloride.

Example 2

0.5 parts of the dyestuff

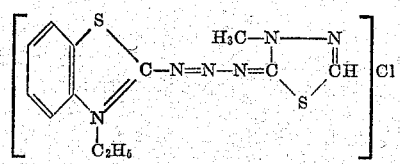

in about a 50° warm solution of 4 parts of a condensation product from hexadecyl-diethylene triamine and 20 mol of ethylene oxide are taken up in 4000 parts of water. The pH of the dye bath so obtained is about 6.5. 100 parts of "Crylor" fibre (polyacrylonitrile fibre of Rhodiaceta S. A. Lyons, France) are entered at 40°, the temperature is raised within 15 minutes to 95–100° and then dyeing is performed at the boil for 30 minutes. The dyed goods are saponified, rinsed and dried. A "Crylon" fibre dyed in vidid yellow-orange shades is obtained which has excellent fastness to washing and light.

"Crylor" dyed similarly and with the same properties is obtained if dyeing is performed at a higher pH value. If for example the goods are entered at 40° into a bath which contains 0.5 parts of dyestuff, 4 parts of a condensation product from olein alcohol and 15 mol of ethylene oxide and 1 part of crystallised sodium carbonate in 3000 parts of water, the pH value of the bath being about 10, and the temperature is raised to 95–100° within 15 minutes and dyeing is performed for 30 minutes at the boil, then after saponifying, rinsing and drying, a similarly and fast dyed fibre is obtained.

Similar results are obtained on dyeing at a lower pH range, for example on adding diluted hydrochloric acid or sulphuric acid to the dyestuff solution and dyeing at a pH value of 3. In all three cases the dyeings have the same shades and the same good properties.

The dyestuff used in the above process is obtained by coupling benzthiazolyl-2-diazonium sulphate with 2-imino-3-methyl-2,3-dihydrothiodiazole-(1.3.4) and then ethylating with diethyl sulphate.

Example 3

0.5 parts of the dyestuff

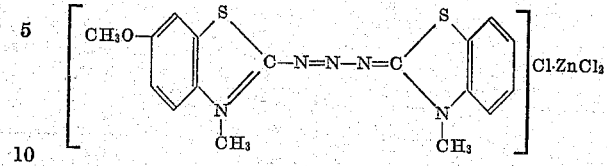

are pasted with 0.5 parts of 80% acetic acid and then dissolved in 4000 parts of water. 2 parts of sodium acetate, 1 part of 80% acetic acid and 4 parts of a condensation product from olein alcohol and 15 mols of ethylene oxide are added to this solution. At 50° 100 parts of "Dralon" (polyacrylonitrile fibre of Farbenfabriken Bayer A.G., Dormagen, North Rhineland-Westphalia, Germany) are entered, the temperature of the bath is raised to 90° within 30 minutes and kept at this temperature for 10 minutes and then dyeing is performed at the boil for 1 hour. The dye bath is exhausted to a great extent. The dyed goods are thoroughly saponified, washed and dried. A pure red-orange "Dralon" fibre dyeing is obtained which has excellent fastness to light and washing.

The dyestuff used above is obtained by methylating the coupling product of 6-methoxy-benzthiazolyl-2-diazonium sulphate and 2-amino-benzthiazole. The reaction product is precipitated with zinc chloride and sodium chloride from aqueous solution.

Further colour salts having similar dyeing properties are given in the following table. The products are obtained by coupling component B with the diazonium salt from amine A and then alkylating with C.

| No. | A | B | C | Shade on polyacrylonitrile fibre |
|---|---|---|---|---|
| 1 | 2-amino-6-methoxy-benzthiazole. | 2-amino-benzthiazole | diethyl sulphate | scarlet. |
| 2 | do | 2-amino-6-methylbenzthiazole. | p-toluene sulphonic acid methyl ester. | red-orange. |
| 3 | do | 2 - amino - 6 - methoxybenzthiazole. | dimethyl sulphate | rust red. |
| 4 | do | do | β-bromacetic acid methyl ester | Do. |
| 5 | do | do | p-toluene sulphonic acid-β-chlorethyl ester. | Do. |
| 6 | do | 2-amino-6-chlorobenzthiazole | dimethyl sulphate | red-orange. |
| 7 | do | 3-amino-indazole | do | orange. |
| 8 | do | 2-amino-pyrazole | do | Do. |
| 9 | do | 2-amino-4-methyl thiazole | n-butyl iodide | yellow-orange. |
| 10 | do | 2-amino-4.5-diethyl thiazole | p-toluene sulphonic acid ethyl ester. | Do. |
| 11 | do | do | benzyl bromide | Do. |

Example 4

0.5 parts of the dyestuff

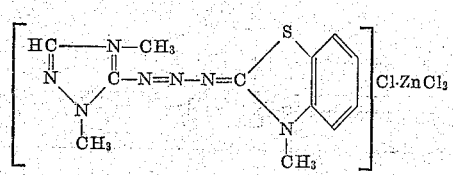

are used to dye "Orlon" (polyacrylonitrile fibre, Du Pont, Wilmington, Delaware U.S.A.) according to the process given in Example 1. The goods are dyed in pure yellow shades.

The dyestuff mentioned is obtained by coupling diazotised 5-amnio-triazole-(1.2.4) with 2-imino-3-methyl benzthiazoline and then alkylating with excess dimethyl sulphate in the presence of magnesium oxide.

Dyeings on polyacrylonitrile having similar properties are obtained under the same conditions on using the dyestuffs given in the following table. These colour salts are obtained by coupling the diazotised amine A with the coupling component B and then alkylating with C.

| No. | A | B | C | Shade on polyacrylonitrile fibre |
|---|---|---|---|---|
| 1 | 5-aminotriazole-(1.2.4). | 2-imino-3-methylthiazoline | n-butyl iodide | yellow. |
| 2 | ___do___ | ___do___ | β-bromacetic acid butyl ester | Do. |
| 3 | ___do___ | 2-imino-3.4.5-trimethylthiazoline. | dimethyl sulphate | Do. |
| 4 | ___do___ | 2-imino-3.6-dimethylbenzthiazoline. | ___do___ | Do. |
| 5 | ___do___ | 2-imino-3-methyl-6-methoxy-benzthiazoline. | p-toluene sulphonic acid ethyl ester. | yellow-orange. |
| 6 | ___do___ | 2-imino-ʋ-methyl-6-chloro-benzthiazoline. | p-toluene sulphonic acid-β-chlorethyl ester. | yellow. |
| 7 | ___do___ | 2-imino-3.6-dimethylbenzthiazoline. | β-bromacetic acid ethyl ester | Do. |
| 8 | ___do___ | 2-imino-3-methylthiazoline | benzylbromide | Do. |
| 9 | ___do___ | 1.3-dimethyl-2-iminobenzimidazoline. | dimethyl sulphate | Do. |
| 10 | ___do___ | 3-amino-indazole | diethyl sulphate | Do. |
| 11 | ___do___ | 3-amino-pyrazole | dimethyl sulphate | Do. |
| 12 | ___do___ | 2-amino-thiodiazole-(1.3.4) | ___do___ | Do. |
| 13 | ___do___ | 2-aminoquinoline | diethyl sulphate | Do. |

Example 5

100 parts of "Dralon" (polyacrylonitrile fibre, Farbenfabriken Bayer A.G. Dormagen, North Rhineland-Westphalia, Germany) are treated as described in Example 3 with 0.5 parts of the colour salt

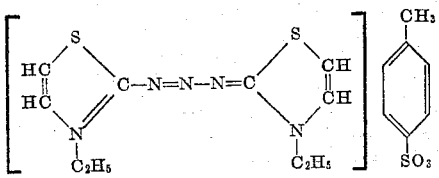

whereupon yellow-orange dyeings having very good fastness to light and washing are obtained.

The colour salt used is obtained by ethylating the coupling product of thiazolyl-2-diazonium sulphate and 2-imino-3-ethyl thiazoline with p-toluene sulphonic acid ethyl ester. The dyestuffs given in the following table have similar behaviour. They are obtained by coupling the diazotised amine A with the coupling component B and then alkylating with C.

| No. | A | B | C | Shade on polyacrylonitrile fibre |
|---|---|---|---|---|
| 1 | 2-aminothiazole | 2-imino-3-methyl-thiazoline | n-butyl iodide | yellow-orange. |
| 2 | 2-amino-4-methyl thiazole. | ___do___ | benzyl bromide | Do. |
| 3 | 2-amino-thiazole | 2-imino-3.6-dimethyl-benzthiazoline. | diethyl sulphate | Do. |
| 4 | ___do___ | 2-imino-3-methyl-6-methoxy-benzthiazoline. | dimethyl sulphate | orange. |
| 5 | ___do___ | 2-imino-1-methyl-pyridine | p-toluene sulphonic acid ethyl ester. | yellow. |
| 6 | ___do___ | 1-3-dimethyl-2-imino-benzimidazoline. | dimethyl sulphate | Do. |
| 7 | ___do___ | 3-amino-indazole | ___do___ | Do. |
| 8 | ___do___ | 2-imino-3.6-dimethyl-benzthiazoline. | β-bromacetic acid ethyl ester | Do. |

What we claim is:

1. A composition of matter consisting of polymeric and copolymeric synthetic materials in form of fibers and threads, which consist chiefly of polyacrylonitrile and of a colour salt the cation of which contains no sulpho and carboxyl groups and which corresponds to the general formula

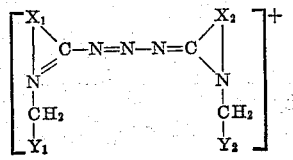

wherein $Y_1$ and $Y_2$ each represent a member selected from the group consisting of hydrogen, lower alkyl, carbalkoxy and mononuclear aryl radicals, and $X_1$ and $X_2$ each represent the divalent radical necessary to complete a heterocyclic nucleus selected from the group consisting of nuclei of the benzthiazole, thiazole, indazole, pyrazole, triazole, benzimidazole, thiodiazole, quinoline and pyridine series and the corresponding 2,3-dihydro nuclei.

2. A composition of matter consisting of polymeric and copolymeric synthetic materials in form of fibres and threads, which consist chiefly of polyacrylonitrile and of a colour salt the cation of which contains no sulpho and carboxyl groups and which corresponds to the general formula

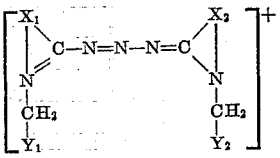

wherein $Y_1$ and $Y_2$ each represent a member selected from the group consisting of hydrogen and lower alkyl radicals, and $X_1$ and $X_2$ each represent the divalent radical necessary to complete a thiazole nucleus.

3. A composition of matter consisting of polymeric and copolymeric synthetic materials in form of fibers and threads, which consist chiefly of polyacrylonitrile and of a colour salt the cation of which contains no sulpho and carboxyl groups and which corresponds to the general formula

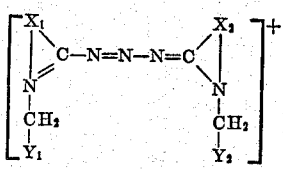

wherein $Y_1$ and $Y_2$ each represent a member selected from the group consisting of hydrogen and methyl and $X_1$ and $X_2$ each represent the divalent radical necessary to complete a benzthiazole nucleus.

4. A composition of matter consisting of polymeric and copolymeric synthetic materials in form of fibers and threads, which consist chiefly of polyacrylonitrile and of a colour salt of the formula

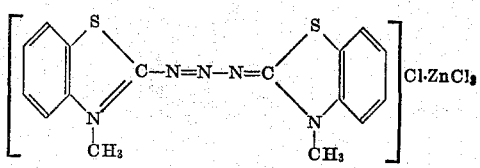

5. A composition of matter consisting of polymeric and copolymeric synthetic materials in form of fibers and threads, which consist chiefly of polyacrylonitrile and of a colour salt of the formula

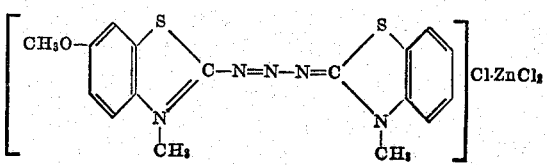

6. A composition of matter consisting of polymeric and copolymeric synthetic materials in form of fibers and threads, which consist chiefly of polyacrylonitrile and of a colour salt of the formula

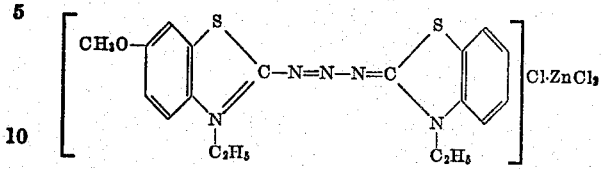

7. A composition of matter consisting of polymeric and copolymeric synthetic materials in form of fibers and threads, which consist chiefly of polyacrylonitrile and of a colour salt of the formula

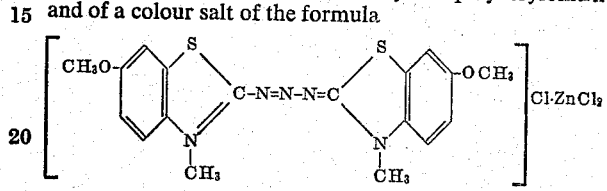

8. A composition of matter consisting of polymeric and copolymeric synthetic materials in form of fibers and threads, which consist chiefly of polyacrylonitrile and of a colour salt of the formula

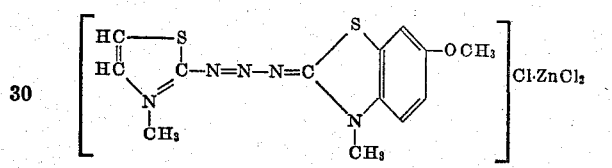

References Cited in the file of this patent

UNITED STATES PATENTS 2,832,764   Huenig ---------------- Apr. 29, 1958